United States Patent [19]

Mastrigt

[11] 4,241,616

[45] Dec. 30, 1980

[54] TENSIOMETER CAPABLE OF BEING ATTACHED TO A CABLE UNDER TENSION

[75] Inventor: Max V. Mastrigt, Tarzana, Calif.

[73] Assignee: W. C. Dillon & Co., Inc., Van Nuys, Calif.

[21] Appl. No.: 74,341

[22] Filed: Sep. 11, 1979

[51] Int. Cl.³ .............................................. G01L 5/04
[52] U.S. Cl. .................................................... 73/144
[58] Field of Search ................ 73/144, 143; 200/61.13

[56] References Cited

U.S. PATENT DOCUMENTS

| | | | |
|---|---|---|---|
| 1,780,238 | 11/1930 | Linoln | 73/144 |
| 3,447,364 | 6/1969 | Gelfand et al. | 73/144 |
| 4,163,126 | 7/1979 | Mastrigt | 200/61.13 |
| 4,171,640 | 10/1979 | Mastrigt | 73/144 |
| 4,182,167 | 1/1980 | Nakayama et al. | 73/144 |

*Primary Examiner*—Donald O. Woodiel
*Attorney, Agent, or Firm*—Ralph B. Pastoriza

[57] ABSTRACT

The tensiometer is designed to measure the tension in cables from extremely heavy loads as might occur in large cranes and in oil well rigs. The tensiometer utilizes a pair of spaced tandem pulleys bearing against spaced points on the cable and a central pulley engaging an opposite point intermediate the spaced points so as to force the cable laterally. The tension in the cable tends to straighten the cable and thus exert a load on the central pulley and by measuring this load, a force is developed constituting a function of tension in the cable. The central pulley is removably mounted from the frame structure on an arm. One end of this arm is thus arranged to be pivoted to the frame structure after the cable has been received against the first and second pulleys. The other end of the arm is then connected to the end of a line from a winch structure mounted on the frame so that the arm can be winched inwardly towards a parallel relationship with the frame thereby urging the central pulley against the cable and moving the cable laterally. When the arm is fully winched to a predetermined position, it is locked in place by a pin and the force exerted on the central pulley tending to straighten the cable is then measured and constitutes a function of the tension in the cable. The winch arrangement permits attachment of the device to the cable while the cable is under tension.

6 Claims, 3 Drawing Figures

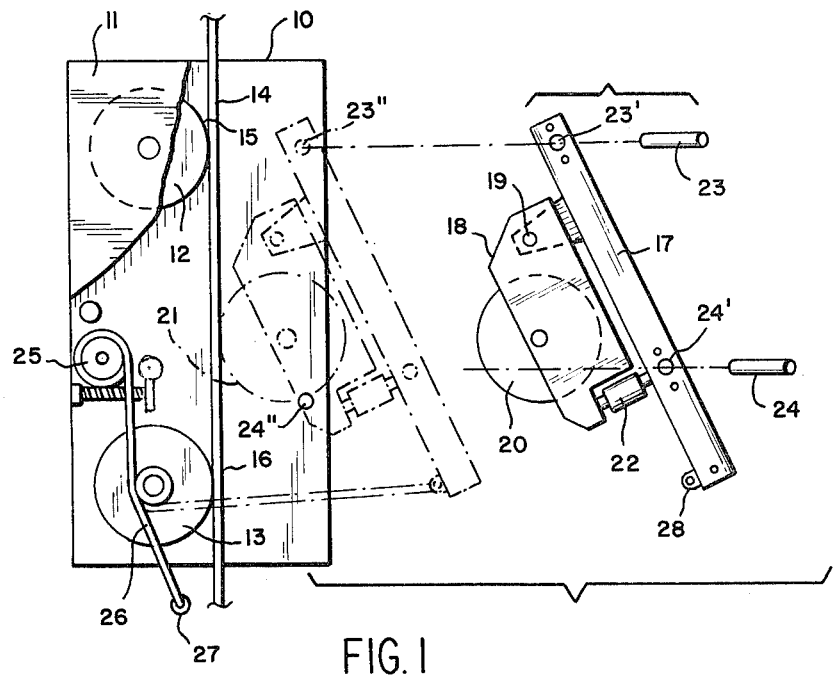
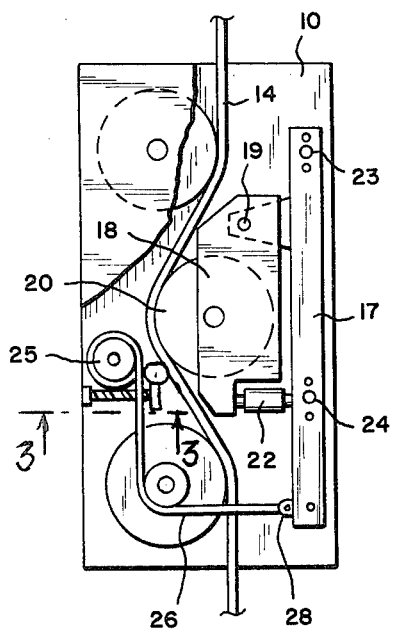
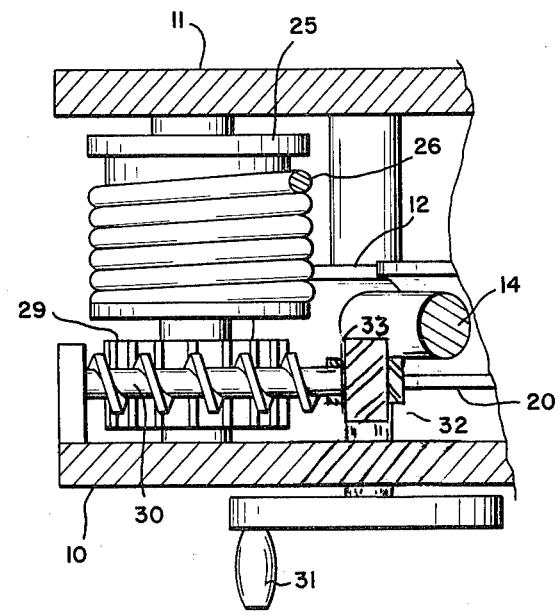

TENSIOMETER CAPABLE OF BEING ATTACHED TO A CABLE UNDER TENSION

This invention relates generally to tension measuring devices or cable tensiometers, and more particularly to an improved tensiometer capable of being attached to a cable under tension and without requiring access to the ends of the cable.

BACKGROUND OF THE INVENTION

In my copending United States Patent Application Ser. No. 906,151 filed May 16, 1978 and entitled TENSION MEASURING DEVICE, there is disclosed a tensiometer so designed as to be attachable to a rope or cable or any equivalent line such as might be used in a derrick, hoist, crane or similar structure without requiring access to the ends of the line. In other words, the tensiometer can be attached without having to disassemble the line from the particular apparatus involved. For convenience in terminology, the rope, cable or line involved will hereafter simply be referred to as a cable, it being understood that any equivalent line, chain, rope or the like could be substituted.

Another of my tensiometers is shown and described in U.S. Pat. No. 4,163,126 issued July 31, 1979 wherein again the device is so designed as to enable attachment thereof to a cable without need of access to the ends of the cable. The tensiometer in this latter patent is for purposes of indicating only when a given load has been exceeded, rather than making a continuous measurement of tension in a line.

While enormous advantages accrue from providing such tensiometers wherein the same can be attached without having access to the ends of the cable, so that it is not necessary to restring cable structures, there is still required a slackening of the cable portion to which the tensiometer is to be attached in order to enable the attachment operation to be carried out. In other words, if the cable is under a heavy load or high tension, it is not possible to attach tensiometers of the type under consideration without requiring some type of auxiliary crane or hoist which will relieve the tension in the cable while attaching the tensiometer. The reason is that the cable must deviate from a straight line in passing under a first guide pulley, over the center pulley and thence under the second guide pulley so that a lateral force is generated against the center guide pulley constituting a function of the load on the cable. A person simply is not strong enough to deflect the cable manually in an attempt to attach the tensiometer device when the load is of any appreciable magnitude.

BRIEF DESCRIPTION OF THE PRESENT INVENTION

With the foregoing considerations in mind, the present invention contemplates an improved tensiometer of the heavy duty type capable of being attached to a cable while the cable is under tension and further without requiring access to the ends of the cable. With such device, it is not necessary to relinquish or relax a load carried by the cable in order to attach the tensiometer.

Briefly, in accord with the invention, there is provided a frame means with first and second tandem cable guides mounted on the frame means for engaging spaced points on one side of the cable. A central cable guide means is provided together with a removable pivot means for pivoting one end portion of the central cable guide means to the frame. Which means on the frame connects to the central cable guide means for swinging the guide means about its pivoted end portion to bring the central guide means into engagement with an opposite side of the cable intermediate the spaced points to thereby deflect the cable while under tension. Finally, a force measuring means carried on the frame means is responsive to the reaction force exerted by the cable on the central guide means when the central guide means has been pivoted to a given position in the frame means so that the force measuring means provides an indication of the tension in the cable.

BRIEF DESCRIPTION OF THE DRAWINGS

A better understanding of this invention as well as further features and advantages thereof will be had by now referring to the accompanying drawings in which:

FIG. 1 is a broken away exploded view of the tensiometer illustrating a first step involved in attaching the same to a cable under tension;

FIG. 2 is a view similar to FIG. 1 showing the components in assembled form and in their positions after completion of attachment to the cable under tension; and, FIG. 3 is a greatly enlarged fragmentary cross section with certain portions shown in full lines looking in the direction of the arrows 3—3 of FIG. 2.

DETAILED DESCRIPTION OF THE PREFERRED EMBODIMENT

Referring first to FIG. 1, the tensiometer includes a frame comprised of parallel plates 10 and 11 rotatably mounting first and second tandem guide pulleys 12 and 13. The arrangement is such that the guide pulleys 12 and 13 will receive and engage spaced portions of a cable 14 while the cable is under tension. These spaced portions are indicated at 15 and 16 and, as viewed in FIG. 1, are on the left side of the cable, the cable having been received between the frame plates 10 and 11 from the right.

Shown exploded away separated from the frame 10 and 11 is an arm 17 supporting a carriage 18 pivoted at one end to the arm 17 as indicated at 19. Carriage 18 rotatably supports a central pulley 20. As will become clearer as the description proceeds, the central pulley 20 is arranged to engage an opposite portion of the cable 14 when the arm 17 is assembled to the frame 10.

Still referring to the arm and carriage structure in FIG. 1, there is further included a load cell means 22 disposed between the end of the carriage 18 opposite the one end pivoted at 19 to the arm 17 and the arm 17 itself as shown.

A removable pivot means in the form of a pivot pin 23 receivable within an opening 23' in the arm 17 and also in an opening 23" arranged to register with the opening 23' is provided for pivoting the arm 17 to the frame members 10 and 11 after the cable 14 has initially been positioned against the tandem pulleys 12 and 13. In FIG. 1, the repositioning of the arm 17 and associated carriage 18 and central pulley 20 is illustrated in phantom lines on the frame portion 10.

Referring now to the left portion of the frame 10 as shown in FIG. 1, there is provided a winch means in the form of a winch drum 25 and line 26. Line 26 terminates in an end 27 arranged to be attached to an end of the arm 17 opposite the removable pivot pin opening 23'. This connection coupling is illustrated at 28 for the arm 17 in FIG. 1.

It will now be understood that after the cable 14 has been slid between the frame plates 10 and 11 to engage the tandem pulleys 12 and 13, the arm 17 has its end portion containing the opening 23' positioned between the plates 10 and 11 and the pivot pin 23 is then inserted, suitable cotter pins being provided on opposite ends to secure the pivot pin 23 in place.

The arm 17 and carriage 18 will then have the position illustrated in the phantom lines in FIG. 1.

After so positioning such that the central pulley 20 engages the opposite intermediate portion of the cable 14 at the point 21, the end 27 of the line 26 from winch drum 25 is connected to the coupling 28 on the arm. This connection is indicated by the phantom lines in FIG. 1.

Referring now to FIG. 2, when the winch drum 25 is wound up, the line 26 will pivot the arm 17 about its pivot pin 23 to bring the center pulley 20 into engagement with the opposite portion 21 of the cable 14 to deflect the cable laterally. A force proportional to the reaction force exerted on the center pulley by the cable after the arm 17 has been winched up to a predetermined position in the frame is transmitted to the load cell 22 through the carriage to provide an indication of tension in the cable. In this respect, it will be appreciated that the reaction force tends to pivot the carriage 18 in a counterclockwise direction about the pivot point 19 thereby placing the load cell 22 in compression.

In the preferred embodiment illustrated, the arm 27 is winched up until its bottom edge is parallel to the edge of the frame 10. In this position, an opening 24' for a locking pin 24 shown in FIG. 1 is in alignment with a frame opening 24" so that the locking pin 24 can then be inserted to lock the arm 17 in its winched up position. Thus, the arm 17 will always be in a consistent position, the force in the line 26 of the winch being relaxed once the locking pin 24 is in place.

FIG. 3 shows the winch drum 25 and operating mechanism therefor in greater detail. Thus, there is included a worm gear 29 coaxial with and secured to the drum 25 together with a cooperating worm 30 mounted to the frame 10. A handle means 31 rotatably mounted in the frame 10 in turn is coupled to the worm 30 by way of helical gears 32 and 33.

It can now be appreciated that manual rotation of the handle 31 to rotate the helical gears will rotate the worm 30 and thus the worm gear 29 and winch 25 to wind up the line 26, with a high mechanical advantage.

From all of the foregoing, it will be evident that the present invention has thus provided a greatly improved tensiometer capable of being attached to a cable while under tension and without requiring access to the ends of the cable.

I claim:

1. A tensiometer capable of being attached to a cable under tension, including, in combination:
   (a) frame means;
   (b) first and second tandem cable guides mounted on said frame means for engaging spaced points on one side of said cable;
   (c) a central cable guide means;
   (d) removable pivot means for pivoting one end portion of said central cable guide means to said frame;
   (e) winch means on said frame connected to said central cable guide means for swinging the guide means about its pivoted end portion to bring the central guide means into engagement with an opposite side of said cable intermediate said spaced points to thereby deflect the cable while under tension; and
   (f) force measuring means carried on said frame means and responsive to the reaction force exerted by said cable on said central guide means when said central guide means has been pivoted to a given position in said frame means so that said force measuring means provides an indication of the tension in said cable.

2. A tensiometer according to claim 1, in which said central cable guide means includes a central pulley; a carriage mounting said pulley for rotation; and an arm supporting said carriage, one end of said arm defining said one end portion of said central cable guide means pivoted to said frame by said removable pivot means, said central pulley, carriage and arm being separable from said frame by disconnecting said removable pivot means so that said first and second tandem cable guides can be positioned against said cable while under tension and said central pulley brought into engagement with the opposite side of the cable intermediate said spaced points without having to have access to the ends of the cable.

3. A tensiometer according to claim 2, in which said force measuring means comprises a load cell positioned between said carriage and said arm, a point on said carriage spaced from said load cell being pivoted to said arm, said central pulley being mounted on said carriage at a point intermediate the pivot point of the carriage and to said arm and said load cell so that a force proportional to the reaction force exerted on the cent pulley by said cable is transmitted by the carriage to said load cell.

4. A tensiometer capable of being attached to a cable under tension, including, in combination:
   (a) a frame;
   (b) first and second tandem guide pulleys mounted to said frame for engaging spaced portions of said cable on the same side of said cable;
   (c) an arm;
   (d) a carriage pivoted at one end to said arm;
   (e) a central pulley rotatably mounted in said carriage at a point spaced from said one end;
   (f) load cell means disposed between the other end of said carriage and said arm;
   (g) removable pivot means for pivoting said arm to said frame for swinging movement in the same plane as said first and second pulleys so that the central pulley can be swung to engage an opposite side portion of said cable intermediate the spaced portions engaged by said first and second guide pulleys; and
   (h) winch means mounted on said frame and having a winch line attachable to said opposite end of said arm, whereby said first and second guide pulleys can be brought into engagement with said spaced portions of said cable while said cable is under tension, and said arm separated from said frame, said arm then being pivoted to said frame by said pivot means and the end of said winch line being connected to said opposite end of said arm, thus enabling securement of said tensiometer to said cable without having access to the ends of said cable, operation of said winch means thence pivoting said arm to bring the central pulley into engagement with said opposite portion of said cable to deflect said cable, a force proportional to the reaction force exerted on said central pulley by said cable after said arm has been winched up to a predetermined position in said frame being transmitted to said load cell through said carriage to provide an indication of the tension in said cable.

5. A tensiometer according to claim 4, in which said winch means includes a drum mounted for rotation on said frame carrying said line, the free end of said line from said drum being attachable to said arm; a worm gear coaxial with and secured to said drum; a worm mounted on said frame in threaded engagement with said worm gear; and a handle means coupled to rotate said worm whereby a high mechanical advantage is provided to said drum to wind up said cable and thereby swing said arm to said predetermined position within said frame.

6. A tensiometer according to claim 5, in which said frame includes an opening for registration with a corresponding opening in the end of said arm to which said cable is attached such that when said arm reaches said predetermined position, said openings are in registration; and a locking pin receivable in said openings to thereby secure said arm in said predetermined position.

* * * * *